(12) United States Patent
Cornelius et al.

(10) Patent No.: US 6,827,354 B2
(45) Date of Patent: Dec. 7, 2004

(54) SEALING SYSTEM ON A STRUCTURAL ELEMENT, SAID SYSTEM HAVING A THROUGH-OPENING THAT CAN BE CLOSED AND METHOD FOR APPLYING SAME

(75) Inventors: Hans-Dieter Cornelius, Dresden (DE); Heinz Pritzke, Kesseldorf /OT Braunsdorf (DE)

(73) Assignee: Glatt Systemtechnik GmbH, Dresden (DE)

( * ) Notice: Subject to any disclaimer, the term of this patent is extended or adjusted under 35 U.S.C. 154(b) by 0 days.

(21) Appl. No.: 10/169,768
(22) PCT Filed: Jan. 25, 2001
(86) PCT No.: PCT/DE01/00320
§ 371 (c)(1),
(2), (4) Date: Jul. 22, 2002
(87) PCT Pub. No.: WO01/55017
PCT Pub. Date: Aug. 2, 2001

(65) Prior Publication Data
US 2003/0011144 A1 Jan. 16, 2003

(30) Foreign Application Priority Data
Jan. 26, 2000 (DE) .......................................... 100 04 695

(51) Int. Cl.[7] .............................................. F16J 15/46
(52) U.S. Cl. ..................... 277/628; 277/605; 277/631; 277/641; 277/642; 277/646
(58) Field of Search ................................ 277/628, 641, 277/642, 631, 646, 605

(56) References Cited

U.S. PATENT DOCUMENTS

| | | | | |
|---|---|---|---|---|
| 2,906,565 A | * | 9/1959 | Schreba ...................... 277/387 |
| 3,171,381 A | * | 3/1965 | Meek ...................... 114/201 A |
| 3,718,178 A | * | 2/1973 | Negre .......................... 164/297 |
| 3,810,635 A | * | 5/1974 | Richter ....................... 277/368 |
| 3,837,616 A | * | 9/1974 | Castriota-Scanderbeg .............. 251/30.01 |
| 3,910,555 A | * | 10/1975 | Bertrem et al. ............. 251/306 |
| 3,967,674 A | * | 7/1976 | Fort ............................ 164/297 |
| 4,135,698 A | * | 1/1979 | Thate et al. ................ 251/61.1 |
| 4,195,815 A | * | 4/1980 | Stager ......................... 251/306 |
| 4,227,702 A | * | 10/1980 | Thate ......................... 277/646 |
| 4,395,017 A | * | 7/1983 | Brautigan .................... 251/306 |
| 4,537,407 A | * | 8/1985 | Jansen et al. ................ 73/49.6 |
| 4,747,601 A | * | 5/1988 | Glachet ....................... 277/628 |
| 5,540,266 A | | 7/1996 | Grau et al. |
| 5,884,660 A | | 3/1999 | Cathrein et al. |
| 6,076,836 A | | 6/2000 | Bretschneider et al. |

FOREIGN PATENT DOCUMENTS

| | | |
|---|---|---|
| DE | 4342962 | 2/1995 |
| DE | 19615646 | 12/1996 |
| DE | 19643248 | 4/1998 |
| FR | 2640598 | * 6/1990 |

* cited by examiner

Primary Examiner—Daniel P. Stodola
Assistant Examiner—Carlos Lugo
(74) Attorney, Agent, or Firm—Jacobson Holman PLLC

(57) ABSTRACT

A sealing system on a first structural element having a first through-opening, including a first closing flap rotatable about an axis for closing the first through-opening. The sealing system can be coupled to a second structural element. The first closing flap is provided with a first dynamic seal on the radial outer circumference thereof. An elastic seal is provided on the wall of the first through-opening and adjacent the first dynamic seal. The inner diameter of the elastic seal is smaller in the non-operated state than the outer diameter of the first closing flap. The first structural element is provided with a second closing flap which essentially matches the first closing flap and can be swivelled together with the first closing flap. The dynamic seal can be inflated radially towards the outside by means of inner pressure when the first closing flap is in the closing position and in such a way that the elastic seal is at least partially and radially displaced towards the outside.

10 Claims, 3 Drawing Sheets

SEALING SYSTEM ON A STRUCTURAL ELEMENT, SAID SYSTEM HAVING A THROUGH-OPENING THAT CAN BE CLOSED AND METHOD FOR APPLYING SAME

This is a nationalization of PCT/DE01/00320, filed 25 Jan. 2001 and published in German.

TECHNICAL FIELD

The invention relates to a sealing system in particular for structural elements which can be coupled to other appropriate structural elements for the purpose of transferring a material between the structural elements. The invention also relates to a method of using the sealing system.

Structural elements here are understood as being coupling parts on any desired arrangement such as transporting or storage containers, transfer arrangements or processing and/or handling machines and the like.

Such arrangements can be used to transport or transfer various types of products, predominantly free-flowing, e.g. particulate, liquid or pasty materials. The materials are often products with an active substance and/or an auxiliary substance for producing a drug or other chemical products which may have an adverse effect on the environment and, in particular, on human beings. It is thus necessary for these materials to be handled, transported or transferred as far as possible with hermetic sealing.

BACKGROUND OF THE INVENTION

The prior art discloses various closing flaps or closing-flap systems by means of which the individual arrangements, once on their own, can be sealed. After the interacting arrangements have been coupled, the closing flaps of the two arrangements can be moved together, parallel to one another, about a common axis into an open position. The design of the seals is particularly important here.

DE 43 42 962 C1 (U.S. Pat. No. 5,540,262) specifies an apparatus for coupling containers. Pivotable closing flaps are arranged in tubular connectors. In this case, the closing flaps are each secured in an essentially circular sealing bead. The circular end surface of the respective tubular connector is overlapped by the sealing bead, which simultaneously mounts the relevant closing flap in a sealing manner, such that an end sealing surface of the respective sealing bead which is directed away from the tubular connector slopes up radially outward in an oblique manner, in the direction of the other tubular connector which is to be connected, such that, when the two tubular connectors are pressed on, with the joint being sealed in the process, those regions sealing beads which are in the vicinity of the sealing surfaces are forced radially outward and relieve the closing flaps of pressure for pivoting purposes, with the result that a cylindrical cross section is maintained and the gap between the closing flaps is reliably closed.

DE 196 43 248 A1 (U.S. Pat. No. 6,076,836) describes a sealing system for a closing flap on a through-opening of an arrangement, which interact with similar closing flaps on other arrangements such that the interiors of the two arrangements can be connected to one another, the individual closing flap having a seal on its periphery for sealing in relation to an associated through-opening in the closed position. At least one of the two interacting closing flaps has a peripheral groove which is bounded on both sides by annular legs, the leg which bounds the groove in relation to the interior of the respective arrangement in the closed position extending into the vicinity of the sealing surface of the throughflow opening and the other leg being shortened radially in relation to the first leg. Located on the seal, in the region radially outside the shortened leg, is an elastic bead which extends over the shortened leg in the axial direction and, in the uncoupled position of the arrangements, at least partially projects beyond the sealing plane between the closing flaps.

SUMMARY OF THE INVENTION

It is an object of the invention to specify a sealing system of the type mentioned in the introduction by means of which the structural elements, during transfer of substances, in particular sensitive or toxic substances, largely prevents even small quantities of said substances from escaping into the surroundings. It is also an object to specify a method of using the sealing system.

The invention achieves the object by a new and nonobvious sealing system and the method of using the sealing system.

Advantageous developments of the invention are described and claimed herein and illustrated in more detail hereinbelow together with the description of the preferred configuration of the invention, including the drawing.

The core of the invention resides in the interaction of the individual elements for various tasks. The invention is realized, in principle, on one of two interacting structural elements. The full effect of the sealing system is achieved in conjunction with the further features according to the subclaims.

In the rest state of the first structural element, i.e. when the first closing flap of the latter, on its own, is closed, the elastic seal presses on the outer radial border of the first closing flap by way of its internal forces or by means of separate spring forces. The first dynamic seal here basically has no internal pressure. The first closing flap seals the first structural element.

Shortly before the first structural element is coupled to another, second structural element, the first dynamic seal is subjected to internal pressure and the elastic seal is thus forced radially outward. The sealing between the first closing flap and the first structural element is not changed in any way here. The only change resides in the circular sealing line between the two being displaced outward.

If the first structural element is then positioned on a suitable surface of the second structural element, the end section of the elastic seal is clamped in between the first structural element and the second structural element, i.e. the elastic seal acts as a radial seal. The elastic seal is also retained in this position if the internal positive pressure in the first dynamic seal is reduced. It is then also the case that the sealing force between the elastic seal and the first closing flap is largely eliminated and the first closing flap can easily be pivoted within the first structural element, i.e. the first closing flap is opened and a material can be transferred between the first structural element and the second structural element. In order to close the first structural element, the first closing flap is pivoted into the closed position again and subjected to internal pressure, and the first structural element is lifted off from the second structural element. Thereafter, the inwardly directed force of the elastic seal can take effect again and the internal pressure in the first dynamic seal can be reduced without impairing the necessary sealing action between the first closing flap and the first structural element.

In this simplest embodiment, it is not necessary for any further elements or a closing flap to be provided on the second structural element. The first closing flap is used solely as the closure for the first structural element.

The design of the elastic seal may vary to a large extent. An advantageous configuration is illustrated in the exemplary embodiment.

In one configuration described herein, it is possible for a second structural element to be designed to correspond to the first structural element and to interact therewith. It is then possible for the first and second structural elements to be closed independently.

In a configuration described herein, the sealing system according to the invention is designed such that, in relative terms, a flushing arrangement is integrated. In this case, the gas duct may be an authentic closed duct or, as in the exemplary embodiment, an annular groove which only becomes a gas duct following closure by the elastic seal.

According to the method of using the sealing system, before the first and second structural elements are uncoupled, when the first and second closing flaps are closed and there is still no internal pressure acting on the first and second dynamic seals, a flushing gas is directed into the gas duct. This can flow through at least one outlet opening into the gaps between the elastic seal and the first dynamic seal and into the gaps between the second through-opening and the second dynamic seal. It is also the case here that minimal residues of the transferred material, e.g. toxic dusts, are blown into the structural elements I and II. If the first and second dynamic seals are then subjected to an internal pressure, it is possible for the first and second structural elements to be separated from one another and for more or less no residues of the transferred material to pass into the surroundings.

The invention is explained in more detail hereinbelow with reference to an exemplary embodiment.

BRIEF DISCRIPTION OF THE DRAWINGS

The drawings shows a sealing system on arrangements which each have one structural element according to the invention.

DETAILED DESCRIPTION OF PREFERRED EMBODIMENTS

Figure 1:
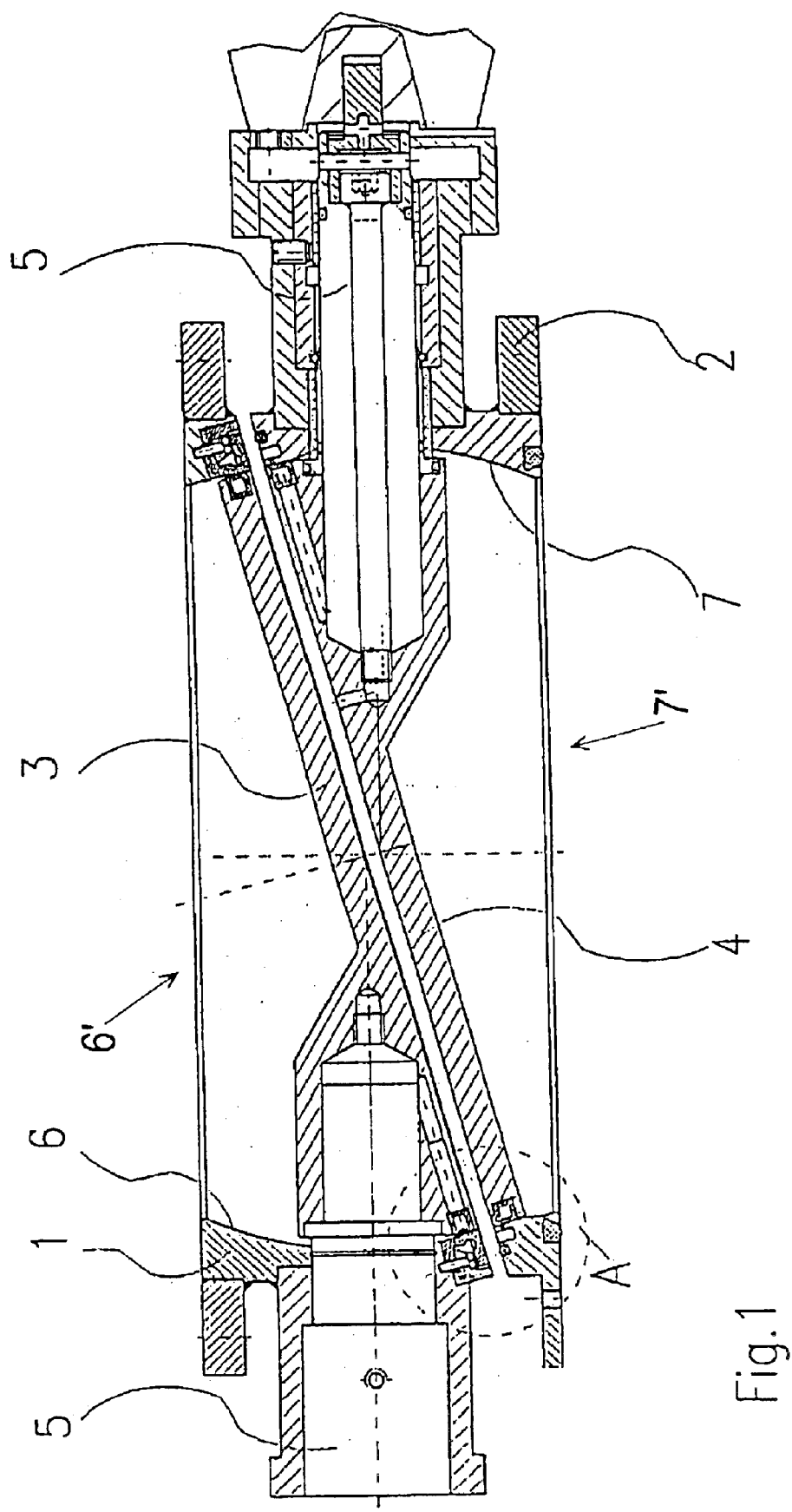
FIG. 1 shows an overall view.

FIG. 1 shows a first structural element which is designed as a coupling flange 1, and is fitted, for example, on a transporting container (not illustrated) and a second structural element which is likewise designed as a coupling flange 2, and is fitted, for example, at a stationary processing station (not illustrated). The intention here is for a pulverulent, toxic material to be transferred from the transporting container into the processing station.

The coupling flanges 1 and 2 are of largely equivalent design. The coupling flange 1 has a first closing flap 3 and the coupling flange 2 has a second closing flap 4, these interacting radially with respective sealing surfaces 6 and 7 of the respective first and second throughflow openings 6' and 7'. The closing flaps 3 and 4 are both connected to a pivoting arrangement 5, of which the axes are located one above the other in the coupled position of the coupling flanges 1 and 2. It is also the case here that the closing flaps 3 and 4 butt against one another and can be pivoted together such that the respective material can pass from the coupling flange 1 to the coupling flange 2.

The exemplary embodiment is illustrated more specifically with reference to the detail A in FIGS. 2 to 5. In FIG. 1, the coupling flanges 1 and 2 are separated from one another. An elastic seal introduced as an elastic sealing ring 8 is arranged in the coupling flange 1 and a first dynamic seal configured as a tubular seal 9 is arranged on the first closing flap 3. Correspondingly, a second dynamic seal, which is likewise configured as a tubular seal 10, is provided on the closing flap 4 in the coupling flange 2. Furthermore, a sealing ring 17 is secured on the coupling flange 2, and there is also provided a gas duct, configured as an annular groove 18, with a plurality of outlet openings 19 to the interior of the coupling flange 2. The outlet openings 19 open out at the sealing surface 7, and level with the tubular seal 10, into a gap (FIG. 5) between the sealing surface 7 and the web 14 as the outer boundary and the tubular seal 10, the closing flap 3 and the tubular seal 9 as the inner boundary.

The use of the sealing system according to the invention is described hereinbelow. In the position according to FIG. 1, the tubular seal 10 is subjected to internal pressure and seals the closing flap 4 in relation to the sealing surface 7. Since the coupling flange 2 belongs to a stationary installation, it is also usually the case that pressure can be generated without difficulty.

The tubular seal 9 on the closing flap 3 is pressureless. In the uncoupled positions, it is also the case that no pressure medium is necessary in principle. When the coupling flange 1 approaches the coupling flange 2 in order that the two can be coupled, then it is also easily possible, in practice, to connect the tubular seal 9 to the pressure source of the tubular seal 10.

The sealing ring 8 in the coupling flange 1 is of u-shaped design with radially outwardly directed legs 11 and 13. The leg 11, which is directed toward the coupling flange 1, is arrested on the coupling flange 1 by a clamping ring 12. The leg 13 is essentially flush with the sealing surface between the coupling flange 1 and the coupling flange 2. The web 14 of the sealing ring 8 is located essentially axially in relation to the throughflow opening, the internal diameter being smaller at the attachment to the leg 13 than at the attachment to the leg 11. Provided in the interior of the sealing ring 8 and at the attachment of the leg 13 is a spring ring 15, which forces this region of the sealing ring 8 permanently in the direction of the axis of the sealing ring 8.

Figure 2:
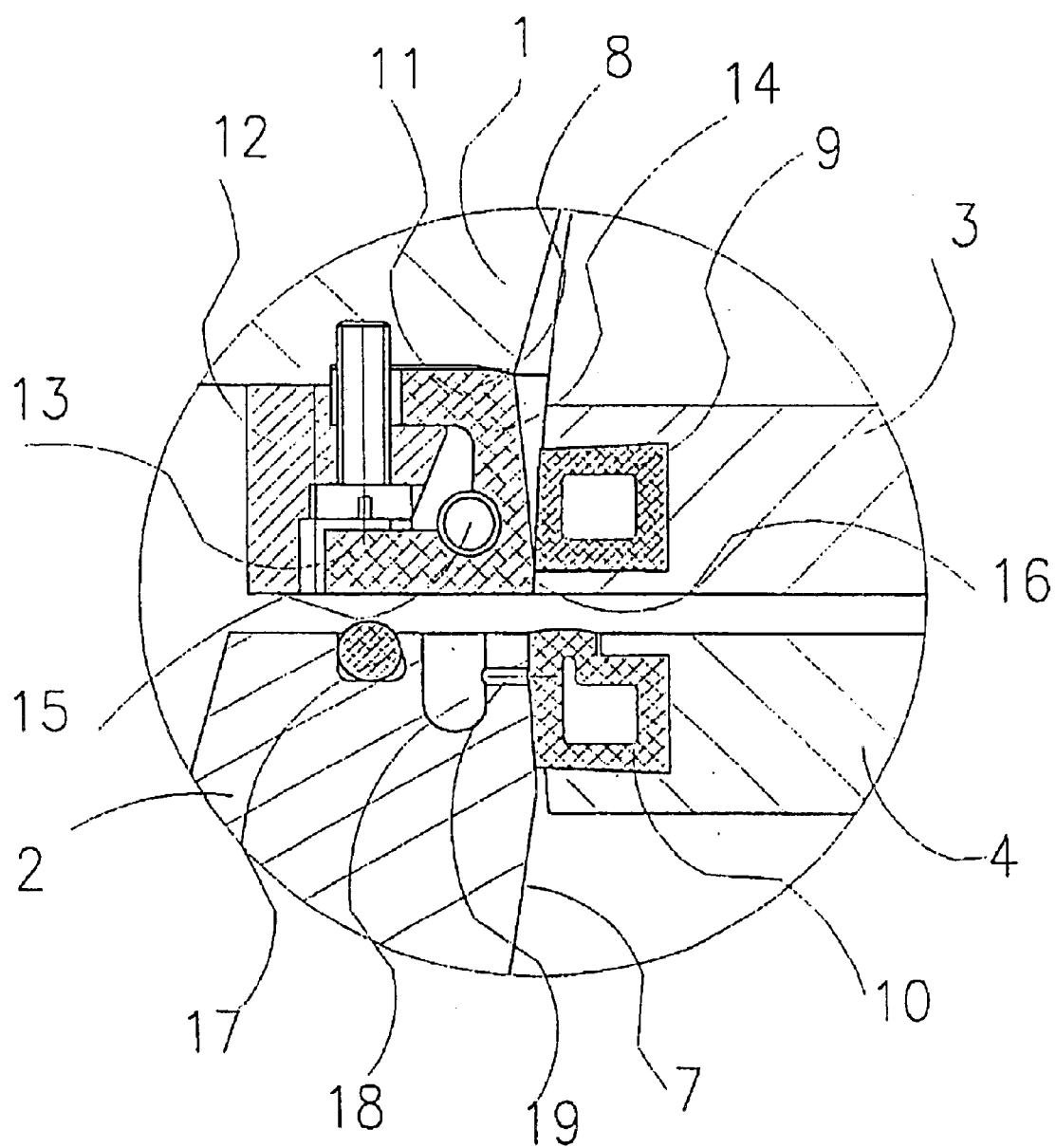
FIGS. 2 to 5 show the detail A from FIG. 1 in different positions of the structural elements in relation to one another.

FIG. 2 clearly shows how, in the abovedescribed position, the sealing ring 8, in the region 16, butts directly against the peripheral surface of the closing flap 3 and against the tubular seal 9 and thus seals the closing flap 3 in relation to the coupling flange 1.

Figure 3:
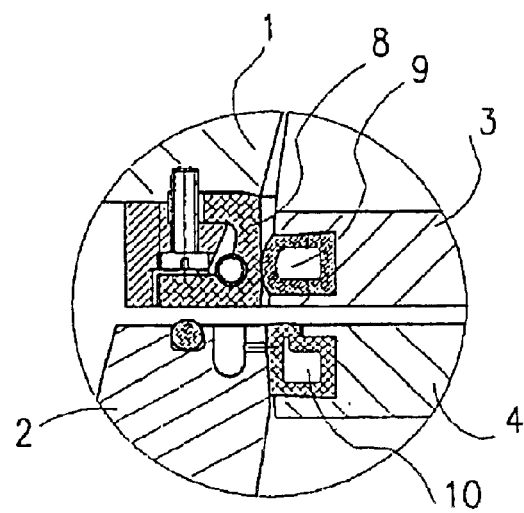

FIG. 3 shows the position of the coupling flanges 1 and 2 in relation to one another just before the coupling. The tubular seal 9 has been subjected to internal pressure and has forced the sealing ring 8 outward.

Figure 4:
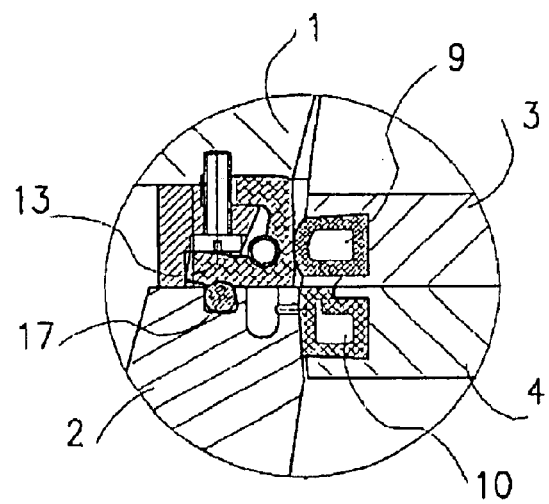

FIG. 4 shows the position of the coupling flanges 1 and 2 in relation to one another following coupling to one another. The closing flaps 3 and 4 butt against one another. In this case, the tubular seal 10, by virtue of its specific design on the outside, butts with sealing action against the closing flap 3, with the result that there are no gaps remaining between the closing flaps 3 and 4 in which, during transfer of a material, residues of the latter could settle.

Provided in the coupling flange 2 is a sealing ring 17 which is positioned such that it presses against the leg 13 of the sealing ring 8 and thus ensures reliable sealing between the coupling flanges 1 and 2.

Figure 5:
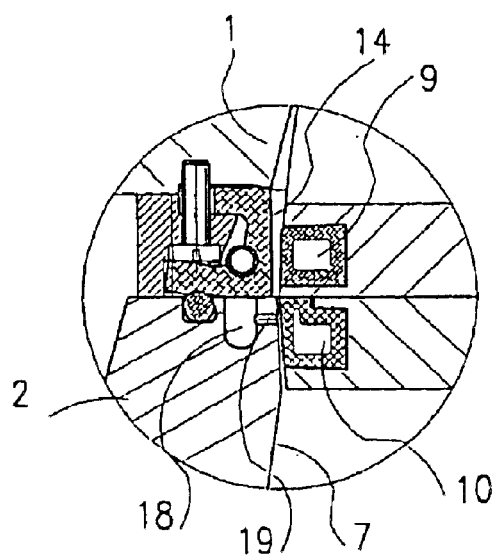

FIG. 5 shows the position of the coupling flanges 1 and 2 corresponding to FIG. 4. The tubular seals 9 and 10 are relieved of pressure and, as a result of internal stressing, have moved away from the sealing ring 8 and the sealing surface 7, respectively. Since, on the other hand, the sealing ring 8 is fixed in position, the closing flaps 3 and 4 can be pivoted freely together for opening purposes.

If the coupling flanges 1 and 2 are to be separated from one another again, the closing flaps 3 and 4 are pivoted together into the closed position. A flushing gas is introduced into the annular groove 18 which, following closure by the leg 13 of the sealing ring 8 (FIGS. 4 and 5), forms a flushing-gas duct. The flushing gas flows through the above-described gap on the outer border of the closing flaps 3 and 4 and, in the process, flushes all the residues of the previously transferred material into the adjacent chambers.

Following sufficient flushing, the tubular seals 9 and 10 are subjected to internal pressure, in which case the positions according to FIG. 4 are re-established.

When the coupling flanges 1 and 2 are then moved away from one another, more or less no residues of the transferred material can pass into the surroundings. The positions according to FIGS. 3 and 2 can be re-established one after the other on the coupling flange 1.

The exemplary embodiment according to the invention which is illustrated can be used extremely advantageously in practice and ensures reliable transportation and transfer of sensitive, toxic and hazardous materials.

Of course, the invention is not restricted to the exemplary embodiment described. It is thus easily possible for the individual seals or surfaces to be adapted to the respective technical requirements.

What is claimed is:

1. A sealing system on a first structural element (1) which has a first through-opening defining an axis, comprising a first closing flap (3) rotatable for opening and closing said first through-opening, said first structural element coupleable to a second structural element (2) axially in relation to said first through-opening, said first structural element including an elastic seal (8) about said first through-opening wherein said elastic seal (8) is abuttable against said second structural element in a sealing plane, said first closing flap (3) including a first dynamic seal (9) on a radially outer circumference of the first closing flap (3), wherein said first dynamic seal lies adjacent said elastic seal (8), wherein said elastic seal (8) in its free state defines said first through-opening being smaller than the external dimension of the first closing flap (3) such that, in a closed position of the first closing flap, the elastic seal is abuttable and sealable against the first closing flap, said first dynamic seal (9), in a closed position of the first closing flap (3), inflatable radially outward such that the elastic seal (8) is displaced in a radially outward direction.

2. The sealing system as claimed in claim 1, wherein said elastic seal (8) is substantially cylindrical having an inner end affixed to said first structural element and an outer end being directed inward toward the axis of said first through-opening.

3. The sealing system as claimed in claim 2, wherein said elastic seal (8) includes a spring element (15) which biases said elastic seal inward toward the axis of the first through-opening.

4. The sealing system as claimed in claim 1, wherein said second structural element (2) includes a second through-opening and a second closing flap (4), said second closing flap (4), is abuttable against and parallel with the first closing flap (3), and can be pivoted together therewith, said second closing flap (4) has a second dynamic seal (10) which corresponds substantially to the first dynamic seal (9) on the first closing flap (3).

5. The sealing system as claimed in claim 1, wherein said second structural element includes a second through-opening and a second closing flap which includes a second dynamic seal of substantially the same configuration as said first dynamic seal (9).

6. The sealing system as claimed in claim 1, wherein said first and second structural elements (1, 2) may be sealable and unsealable in relation to one another when coupled together.

7. The sealing system as claimed in claim 4, wherein said second structural element (2) includes an annular gas duct (18) for receiving gas under pressure, said duct communicating with at least one outlet opening (19) adjacent the second through-opening and facing the second dynamic seal (10).

8. A method of using a sealing system as claimed in claim 1, comprising the steps of subjecting the first dynamic seal (9) to an internal pressure before the first structural element is coupled to the second structural element such that the elastic seal (8) is forced radially outward, and in order to open the closing flaps (3, 4), reducing the internal pressure in the first dynamic seal (9).

9. The method as claimed in claim 8, further comprising the step of blowing a flushing gas-into a space between the first dynamic seal and the elastic seal.

10. A method of using a sealing system as claimed in claim 7, comprising the step of blowing a flushing gas into the annular duct (18), and subjecting the second dynamic seal (10) an internal pressure.

* * * * *